R. TATTU.
WAVE MOTOR.
APPLICATION FILED JULY 25, 1912.

1,071,533.

Patented Aug. 26, 1913.

Witnesses:

Inventor
Radu Tattu
By his Attorney

UNITED STATES PATENT OFFICE.

RADU TATTU, OF NEW YORK, N. Y.

WAVE-MOTOR.

1,071,533.  Specification of Letters Patent.  Patented Aug. 26, 1913.

Application filed July 25, 1912. Serial No. 711,429.

*To all whom it may concern:*

Be it known that I, RADU TATTU, a citizen of the United States, and resident of the city of New York, in the county of Kings and State of New York, have invented a certain new and useful Wave-Motor, of which the following is a specification.

My invention relates to improvements in wave motors, and the object of my invention is to provide a device whereby the wave motion of a body of water may be utilized and converted into power.

I accomplish this object by the device illustrated in the accompanying drawings, in which—

Figure 1:
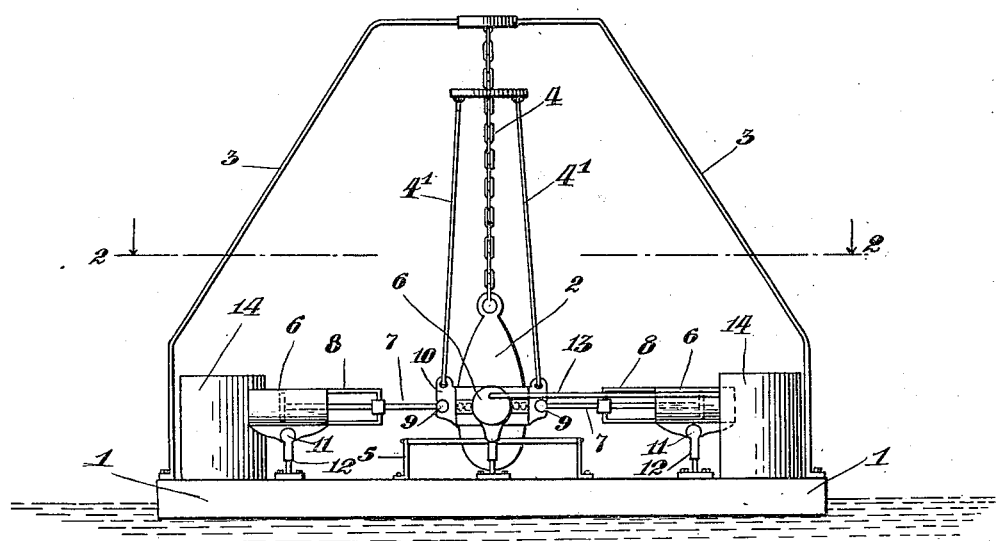
Figure 2:
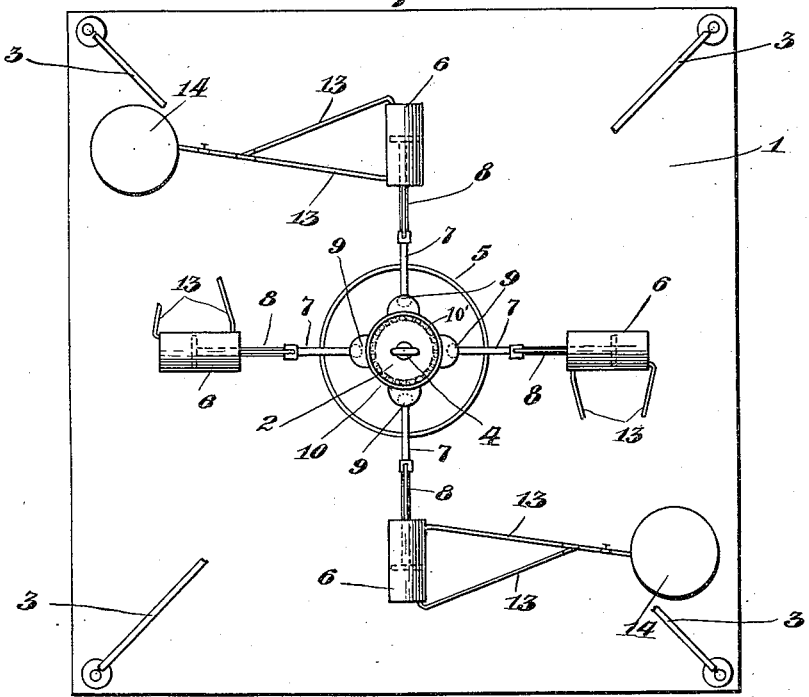

Figure 1 is an elevation of the device, and Fig. 2 is a view of the same on the line 2—2 in Fig. 1.

Similar characters refer to similar parts throughout the several views.

On a float 1 of any desired construction, I support a weight 2 by means of a frame 3 or similar structure. The weight 2 is preferably supported over the approximate center of the float 1 by means of a chain 4 and is free to swing in any direction within the limits of the stop 5. At suitable places on the float 1 I provide a plurality of compressed air cylinders 6 6 6 6 of any desired construction, the pistons of which are severally provided with rods 7 and guides 8 for preserving the alinement of the piston rods 7. Upon the end sections of the piston rod 7 I provide balls 9 seated in a belt section 10 surrounding the weight 2 and which belt section 10 is supported by the cables or chains 4'. I also provide a ball bearing 10' of the usual type intermediate the belt 10 and weight 2 for the purpose of reducing the friction, as the weight 2 rotates or twists in the belt 10. The compressed air cylinders 6 are preferably mounted on the ball and socket joints 11 whereby they are free to swing with the movement of their piston rods, and are preferably mounted on the swivel joints 12 affording added flexibility. My device being thus assembled it is apparent that as the float 1 rocks with the wave motion of the water upon which it rests, the weight 2 will be caused to swing by gravity in the directions imparted to it by the swaying of the float 1 and this swaying of the weight 2 will actuate the piston rods 7, thereby compressing the air in the cylinders 6 6 in the usual well known manner. The air so compressed in the cylinders 6 6 is conducted through flexible tubing 13 13 to compressed air reservoirs 14 14 where the compressed air is stored for use, or if desired, the compressed air may be conducted to any desired point for use. I have shown two of these compressed air reservoir tanks 14 but it is apparent that as many of such tanks may be used as may be desired, and suitable devices may be applied for supplying compressed air to all of the different tanks alternately or progressively as desired, and any well known means may be provided for disconnecting the several tanks when a predetermined supply of compressed air has been delivered. It is also apparent that the usual valves will be required in the supply ducts 13, and in the compressed air cylinders 6, but in view of the fact that these are obvious and well known, I have not shown them in the drawings.

Having thus described my invention, what I claim is

1. A wave motor including a float, a weight supported thereby and suspended above the float, cylinders carried by the float, pistons operative in the cylinders, rods extending from the pistons, and a connection joining said piston rods and loosely encircling the weight.

2. A wave motor including a float, a weight supported thereby and suspended above the float, cylinders carried by the float, pistons operative in the cylinders, rods extending from the pistons, and a connection joining said piston rods and loosely encircling the weight, and means carried by the float to engage the weight and limit its movement.

3. A wave motor including a float, a supporting element secured thereto, a weight, a flexible connection between said element and weight, pumps supported on the float, and means connecting the pumps and loosely encircling the weight.

Signed at New York in the county of New York and State of New York this 20th day of July A. D. 1912.

RADU TATTU.

Witnesses:
 JUSTIN S. GALLAND,
 L. H. BROWN.

---

Copies of this patent may be obtained for five cents each, by addressing the "Commissioner of Patents, Washington, D. C."